United States Patent
Short et al.

(10) Patent No.: US 10,027,626 B2
(45) Date of Patent: Jul. 17, 2018

(54) METHOD FOR PROVIDING AUTHORITATIVE APPLICATION-BASED ROUTING AND AN IMPROVED APPLICATION FIREWALL

(71) Applicant: Cisco Technology, Inc., San Jose, CA (US)

(72) Inventors: Todd Short, Sudbury, MA (US); Andrew Zawadowskiy, Hollis, NH (US); Antonio Martin, Nashua, NH (US); Vincent E. Parla, North Hampton, NH (US)

(73) Assignee: Cisco Technology, Inc., San Jose, CA (US)

( * ) Notice: Subject to any disclaimer, the term of this patent is extended or adjusted under 35 U.S.C. 154(b) by 40 days.

(21) Appl. No.: 15/156,646

(22) Filed: May 17, 2016

(65) Prior Publication Data
US 2016/0261562 A1 Sep. 8, 2016

Related U.S. Application Data

(62) Division of application No. 14/041,107, filed on Sep. 30, 2013, now Pat. No. 9,369,435.

(51) Int. Cl.
*H04L 29/06* (2006.01)
*H04L 12/721* (2013.01)
(Continued)

(52) U.S. Cl.
CPC ........ *H04L 63/0227* (2013.01); *H04L 45/306* (2013.01); *H04L 45/566* (2013.01);
(Continued)

(58) Field of Classification Search
CPC ..... H04L 63/0227; H04L 67/02; H04L 63/08; H04L 45/306; H04L 63/0245; H04L 63/10; H04L 45/566
See application file for complete search history.

(56) References Cited

U.S. PATENT DOCUMENTS 6,973,085 B1 * 12/2005 Acharya ............... H04L 49/355
370/352
7,664,857 B2 * 2/2010 Ovsiannikov ....... H04L 63/0281
370/252
(Continued)

OTHER PUBLICATIONS

Ackermann, Ralf, et al., "Associating Network Flows with User and Application Information," Darmstadt University of Technology—Industrial Process and System Communications (KOM), Darmstadt, Germany, 2000, 4 pages.
(Continued)

*Primary Examiner* — Meng Li
(74) *Attorney, Agent, or Firm* — Meunier Carlin & Curfman LLC

(57) ABSTRACT

A method for providing authoritative application-based routing and an improved application firewall, as well as a method for application classification, is described. The first embodiment, which provides a method for authoritative application-based routing, comprises tagging packets with an application identifier, and pushing the tagged packets to the network to enable the application identifier to be used in routing and priority decisions. In the second embodiment, a method for improving application firewall comprises using the application identifier to minimize the amount of processing required by the firewall when analyzing packet information.

20 Claims, 6 Drawing Sheets

(51) Int. Cl.
   *H04L 12/725* (2013.01)
   *H04L 29/08* (2006.01)
(52) U.S. Cl.
   CPC .......... *H04L 63/0245* (2013.01); *H04L 63/08* (2013.01); *H04L 63/10* (2013.01); *H04L 67/02* (2013.01)

(56) References Cited

U.S. PATENT DOCUMENTS

| | | | | |
|---|---|---|---|---|
| 8,051,491 B1* | 11/2011 | Cavage | ............... | G06F 21/6218 |
| | | | | 707/609 |
| 8,259,722 B1* | 9/2012 | Kharitonov | ........... | H04L 43/028 |
| | | | | 370/392 |
| 9,083,740 B1* | 7/2015 | Ma | ......... | H04L 63/145 |
| 9,258,313 B1* | 2/2016 | Knappe | .................. | H04L 63/12 |
| 2004/0268149 A1 | 12/2004 | Aaron | | |
| 2005/0233744 A1* | 10/2005 | Karaoguz | ............ | H04W 12/08 |
| | | | | 455/432.3 |
| 2008/0034418 A1 | 2/2008 | Venkatraman et al. | | |
| 2010/0082737 A1* | 4/2010 | Dankle | .................. | G06F 9/546 |
| | | | | 709/203 |
| 2010/0115582 A1 | 5/2010 | Sapp et al. | | |
| 2011/0016180 A1* | 1/2011 | Bharadhwaj | ........... | G06Q 10/10 |
| | | | | 709/205 |
| 2011/0072508 A1* | 3/2011 | Agarwal | ............. | H04L 63/0227 |
| | | | | 726/13 |
| 2012/0042216 A1 | 2/2012 | Blubaugh | | |
| 2014/0003434 A1* | 1/2014 | Assarpour | ............. | H04L 43/026 |
| | | | | 370/392 |
| 2014/0362790 A1* | 12/2014 | McCann | ............. | H04W 40/248 |
| | | | | 370/329 |

OTHER PUBLICATIONS

Cisco SCE 2000 Series Service Control Engine, Data Sheet, Cisco Systems, Oct. 2006, 6 pages.
Dell™ SonicWall™ SonicOS Deep Packet Inspection, retrieved on Jan. 10, 2014 from http://www.sonicwall.com/us/en/products/Deep_Packet_Inspection.html, 2 pages.

* cited by examiner

METHOD FOR PROVIDING AUTHORITATIVE APPLICATION-BASED ROUTING AND AN IMPROVED APPLICATION FIREWALL

CROSS-REFERENCE TO RELATED APPLICATIONS

This application is a divisional of U.S. application Ser. No. 14/041,107, filed Sep. 30, 2013, titled "METHOD FOR PROVIDING AUTHORITATIVE APPLICATION-BASED ROUTING AND AN IMPROVED APPLICATION FIREWALL," which is incorporated by reference herein in its entirety.

BACKGROUND

In today's computer networks, network devices lack sufficient information about which particular application on an end user device originated each packet or flow. With increased host mobility, self-managed devices, and the majority of applications moving to http-based communications, there is a need for greater visibility into the origin of packets and flows. There is also a need in the art for delivering this information to the network for more intelligent routing decisions.

SUMMARY

Broadly described, the various embodiments of invention provide for a method for providing authoritative application based routing and an improved application firewall. In a first embodiment, a method of providing authoritative application-based routing comprises the steps of: gathering associated information regarding one or more packets originating from an application; sending the associated information to a network-based policy engine, wherein the policy engine logs the application information into an application information log; receiving an application identifier which has been verified by the policy engine; and tagging the application identifier onto all packets from the application. In this first embodiment, the tagging step may involve including the application identifier in an ACK or SYN packet, a http header, or an L2 security group tag. The routing-based choices may include any number of options, including without limitation, granting access to a network trusted zone, restricting the application's access to only include the internet access, dropping all packets tagged with the application identifier; routing packets tagged with the application identifier for deep packet inspection, and assigning higher QoS for packets tagged with a specific application identifier. The routing choices may also include placing packets with a specific application identifier in a low priority routing queue or utilizing the application identifier to provide dynamic routing decisions in a software-defined network.

In a second embodiment, a method for providing an improved application firewall comprises the steps of: receiving a hash of an application requesting network access, along with associated information; determining an application identifier for the application; validating the application identifier with a cloud-based service; and, communicating the application identifier to the firewall to increase efficiency in validation and lookup processes. An application firewall is normally configured to reference a network information database wherein the network information database includes application network behavior information and other network information which would assist the firewall in identifying micro-applications (such as the "Farmville" micro-application within the Facebook application). The firewall is further configured to monitor packets for an embedded application identifier to determine if the behavior of the packets match the application network behavior information for the application associated with the packet's embedded application identifier. The method in this second embodiment may be, but is not required to be, performed by a policy engine, wherein the policy engine may reside in an application firewall or a stand-alone computer device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF DRAWINGS

Like reference numbers and designations in the various drawings indicate like elements.

DETAILED DESCRIPTION

Figure 1:
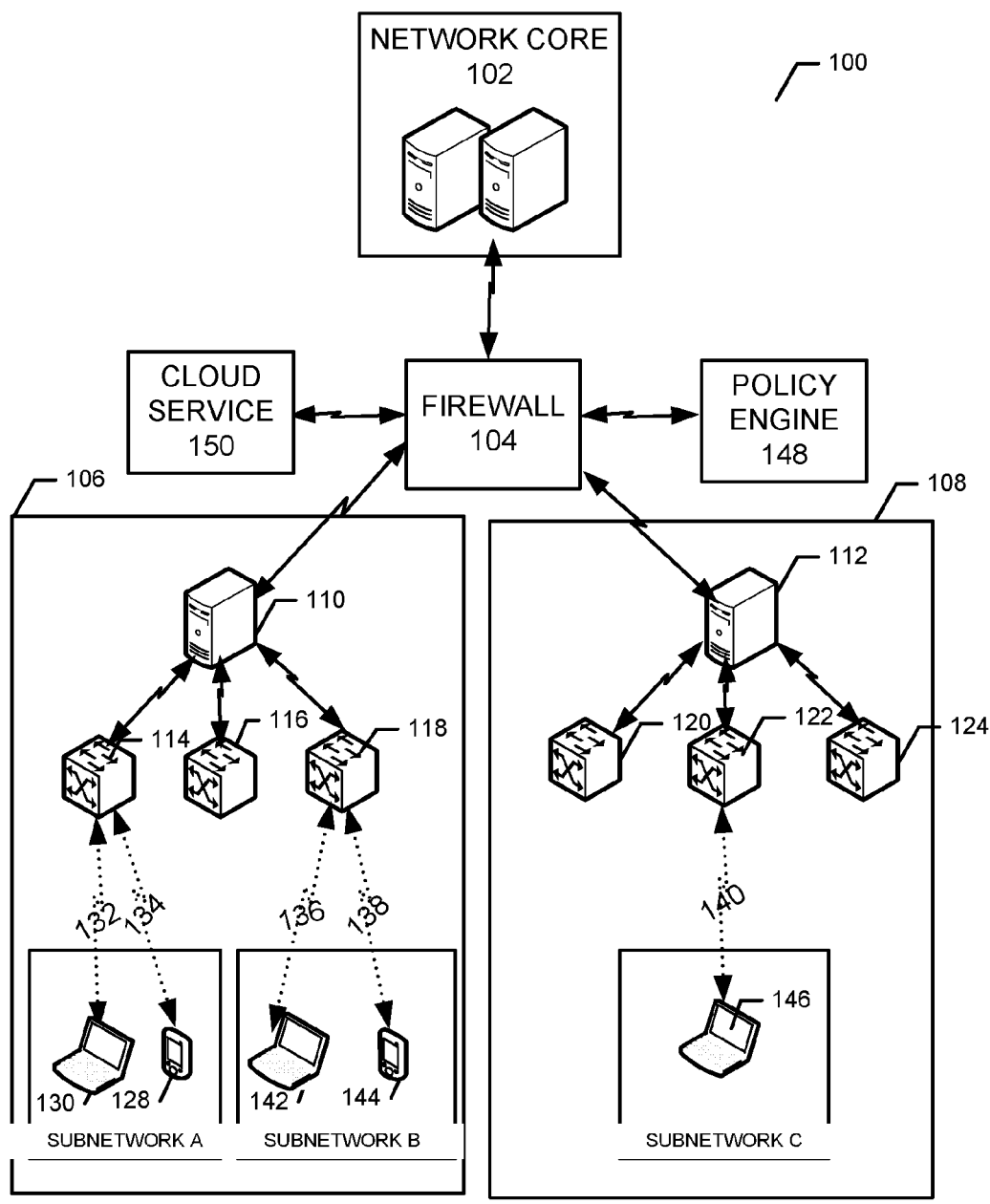
FIG. 1 is a block diagram of an example environment for managing application streams in a network.

FIG. 1 is a block diagram of a system according to the various embodiments of the invention. Network 100 comprises a network core 102, which may include one or more servers serving as the backbone of network 100. Network core 102 comprises equipment to provide paths for the exchange of information between a plurality of distributed networks (106 and 108). Each distributed network includes a distributed network server (110 and 112, respectively), which is coupled to one or more routers (114-124). Those skilled in the art will appreciate that various types and quantities of equipment and structure may be included in the network core and each distributed network within the spirit and scope of this invention.

To safeguard communications between distributed networks 106 and 108, network core 102 provides an application firewall server (referred to herein as "firewall") 104. Those skilled in the art will appreciate that firewall 104 may comprise one computer device (as described in FIG. 11) or distributed over more than one computer devices. Firewall 104 is coupled to a policy engine 148, which may be included in firewall 104 or may comprise a stand-alone computer device as described in FIG. 6 with a network information database stored in storage system 604. Firewall 104 is also coupled to cloud service 150, which is a cloud-based global service provider of application information.

System 100 further includes one or more end user devices, wherein each end user device is communicatively coupled to a router 116-124 (depending on the router servicing the subnetwork wherein the end user device is located), which may comprise, without limitation, a WIFI connection, ethernet connection, or Apple Bonjour connection. This connection, referred to herein as simply a "connection", is shown as 132-140 in FIG. 1. End user devices in system 100 may utilize one or more applications, such as a Facebook application, Microsoft Word application, or Firefox application which may generate a plurality of application flows or packets (hereinafter referred to as "packets").

Figure 2:
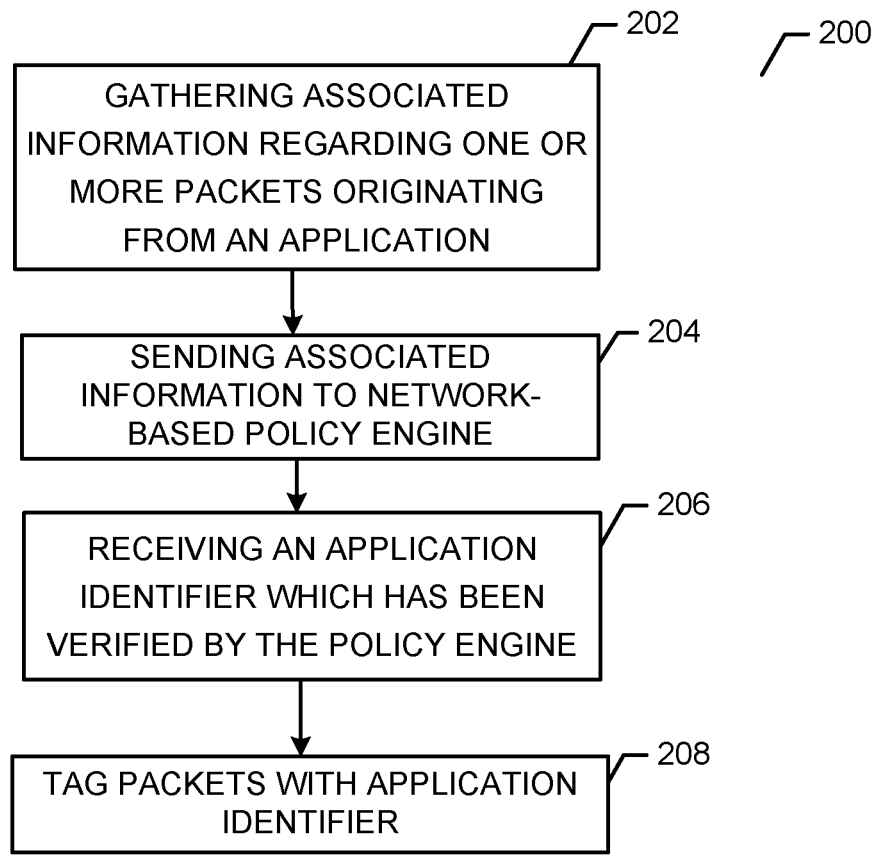
FIG. 2 is a flow diagram illustrating the method of the first embodiment of the invention.

FIG. 2 is a flow diagram illustrating the first embodiment of the invention, which comprises a method 200 for providing authoritative application-based routing. In this first embodiment, software on an end user device may authoritatively identify what applications are running and associate the application, via an application identifier, with packets transmitted to the network 100. Thus, this method 200 provides authoritative information to all devices in network 100 that can be utilized for routing and priority decisions.

Method 200 begins by gathering associated information regarding one or more packets originating from an application at step 202. This associated information may comprise any information collected by the end user device which may assist in identifying the application. For example and not limitation, associated information may include application name, size, path, run time information, application code sections, source and destination IP addresses, ports, and protocols.

The associated information may be collected in any number of ways within the spirit and scope of the invention. For example and without limitation, a virtual machine hypervisor could reside on top of a number of other virtual machines in the network. The hypervisor could provide an application program interface (API) with visibility to network and file activity, and also, with the ability to inspect processes running on end user devices. The hypervisor would then utilize the information obtained from such visibility and the inspection process to generate the associated information. In another embodiment, if the application is a JAVA application, the hash of the JAVA application would be sent to the firewall 104 without any associated information. Those skilled in the art will appreciate that any number of methods for obtaining and generating the associated information could be within the spirit and scope of the invention.

At step 204, method 200 sends the associated information to a network-based policy engine, wherein the policy engine logs the application information into an application information graph or log. At step 206, method 200 receives an application identifier which has been verified by the policy engine. At step 208, method 200 tags the application identifier onto all packets from the application, wherein these tagged packets are pushed to other devices in network 100.

Figure 3:
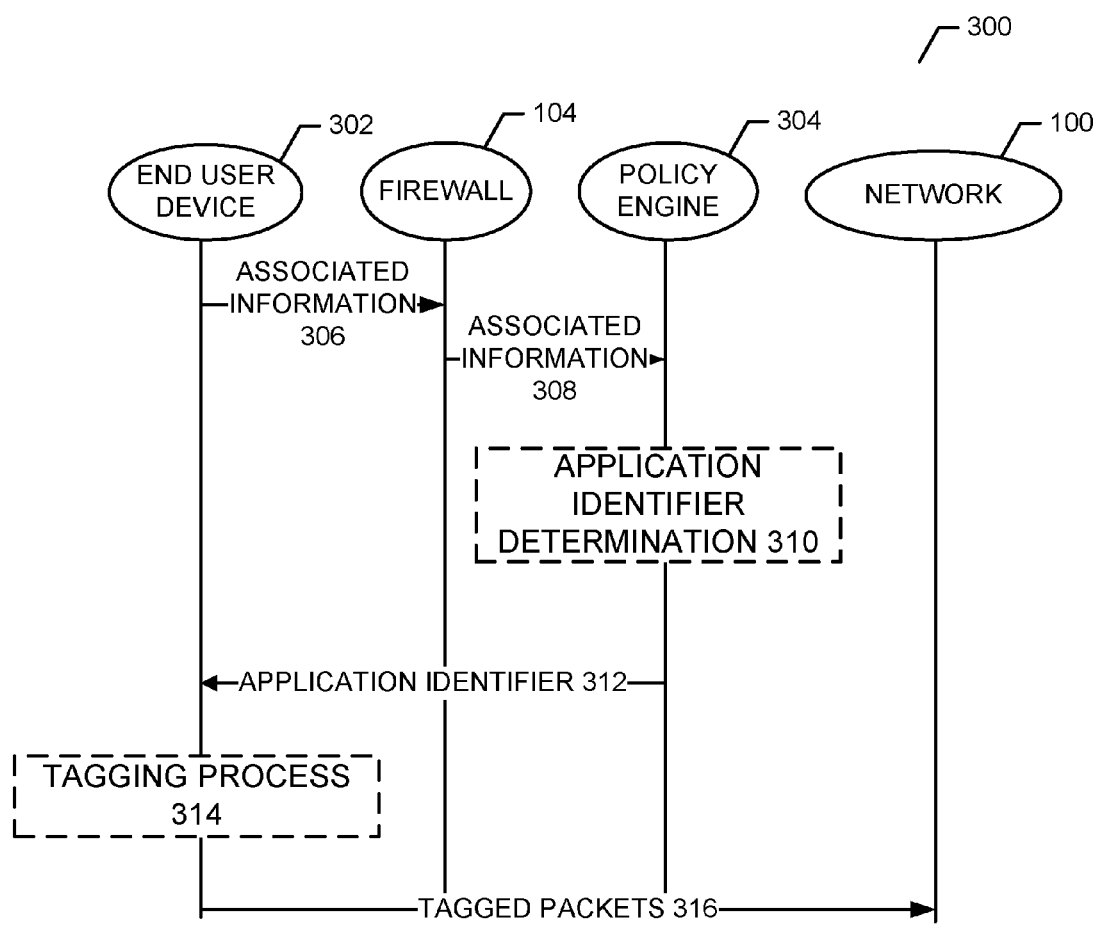
FIG. 3 is a signaling diagram illustrating the method of the first embodiment of the invention.

FIG. 3 comprises a signaling diagram illustrating the signals between the network components involved in method 200. End user device 302 sends associated information 306 to firewall 104, which in turn sends the associated information to policy engine 308. The policy engine, as discussed in FIG. 1, may reside in a firewall 104, may comprise a stand-alone network device as described in FIG. 6, or may reside in the cloud as a cloud-based service (or a complement to a cloud based service). After executing the application identifier process 310, policy engine returns a signal to firewall 104 including an application identifier 312. The end user device 302 executes a tagging process 314 on packets from the same application, wherein the tagging process 314 may involve including the application identifier in an ACK or SYN packet, a http header, an L2 security group tag or another L2/MAC layer tag.

Once tagged, the tagged packets 316 are pushed, or allowed to transverse, network 100. By pushing the application identification out to network 100 by pushing the tagged packets 316, network devices in network 100 can use this information for routing choices and priority decisions. The routing-based choices may include any number of options, including without limitation, granting access to a network trusted zone, restricting the application's access to only include the internet access, dropping all packets tagged with the application identifier; routing packets tagged with the application identifier for deep packet inspection; routing packets to an inspection engine or assigning a QoS metric (such as higher or lower QoS) for packets tagged with a specific application identifier. The routing choices may also include placing packets with a specific application identifier in a low priority routing queue or utilizing the application identifier to provide dynamic routing decisions in a software-defined network.

In another embodiment, instead of an application identifier, the firewall would utilize the application's policy value instead of an application identifier to effectuate routing choices. In other words, instead of tagging a packet with an application identifier associated with the direct application, the packets could be tagged with a policy identifier associated with the data flow (wherein the policy identifier could represent routing choices to drop the packet, route the packet to deep packet inspection, allow the packet, provide higher QoS for the packet, etc). One such embodiment could involve a TCPIP stream, wherein in the initial packet negotiation, the application identifier could be placed in the SYN packet, SYN ACK packet, or the first data packet.

Figure 4:
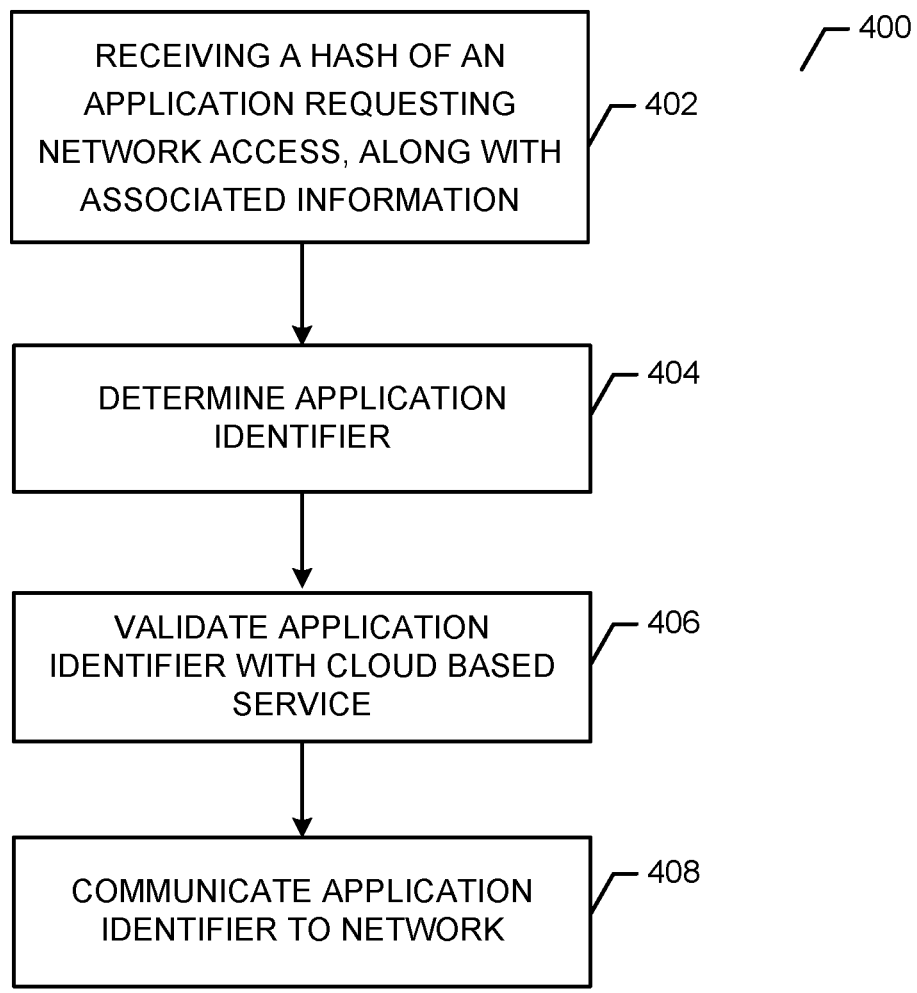
FIG. 4 is a flow diagram illustrating the method of the second embodiment of the invention.

FIG. 4 is a flow diagram illustrating the second embodiment of the invention, which comprises a method 400 for providing an improved application firewall. Method 400 utilizes an application identifier as described in method 200, but does so to assist in application classification. With precise application information from the end user device, the search space for the application firewall is greatly reduced. Instead of matching a flows pattern to an entire database of possible applications, the firewall can effectively reduce the search space with the information included in the application identifier.

Method 400 first receives a hash of an application requesting network access, along with associated information at step 402. The hash of the application comprises the resulting data from applying a cryptographic hash function. At step 404, method 400 determines an application identifier for the application. This determination may comprise the application identification process as described in FIGS. 6-7, but those skilled in the art will appreciate that any number of application identification processes that allow the matching of characteristics or features of an application flow with stored criteria to determine the appropriate application identifier may be within the spirit and scope of the present invention.

At step 406, method 400 validates the application identifier with a cloud-based service, which is an electronic service that provides a global view of application information and classification across a plurality of networks. The cloud-based service could also complement the policy engine during the application identifier process 310. Those skilled in the art will appreciate that multiple type, brands, or forms of cloud-based services may be used within the spirit and scope of the present invention.

At step 408, method 400 communicates the application identifier to the firewall from the policy engine to increase efficiency in validation and lookup processes. With this precise application information from end user device 502, the search space of the application firewall is reduced when matching flows to a pattern of database of applications, which may be stored in the firewall 104, policy engine 506, or any other network device in or accessible by network 100. The firewall, as part of step 408, references a network information database, wherein the network information database comprises application network behavior information and other network information, and also, monitors packets with the application identifier to determine if the packets match the expected behavior of the application.

Figure 5:
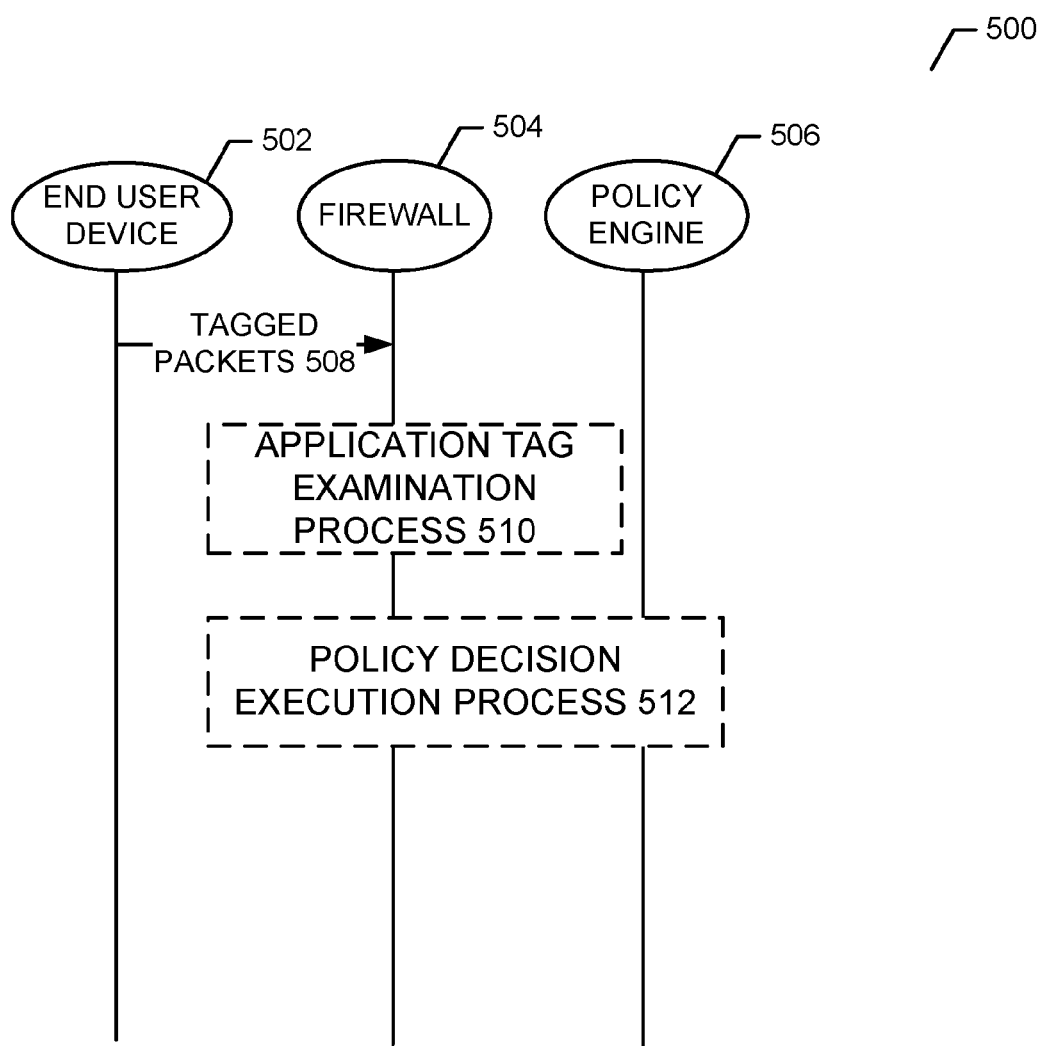
FIG. 5 is a signaling diagram illustrating the method of the second embodiment of the invention.

FIG. 5 is a signaling diagram illustrating the signals involved in method 400 for providing an improved firewall according to the second embodiment of the invention. As illustrated in this general signaling diagram, the firewall 104 and policy engine 506 cooperate together to provide the improved application firewall in accordance with the second embodiment of the invention. This symbiotic relationship may involve multiple scenarios of cooperation, and the signaling diagram 500 only illustrates one of these scenarios for exemplary purposes only.

As shown in signaling diagram 500, the end user device 502 sends one or more tagged packets 508 to firewall 504. The firewall 504 then executes an application tag examination process 510 to determine the application identifier that is associated with the one or more packets originating from the application. These packets are then tagged with the application identifier via the tagging process 516 The firewall 504 then executes the policy decision execution process 512, which comprises the firewall 504 referencing a network information database for a policy decision associated with the application identifier. In an alternate embodiment, the firewall 504 may reference a network information database for a policy decision associated with a policy value coupled with one or more packets. The firewall executes the policy decision during the policy decision execution process 512, which may comprise, but is not limited to, adding a new application identifier, stripping out the old application identifier, allowing the application identifier to remain intact, routing the packets associated with the application identifier to a new path, or adding a QoS metric to packets associated with the application identifier.

This signaling diagram illustrates one of the significant advances of the second embodiment of the invention, as the firewall is not required to match the packets against all of the stored information relating to expected behaviors of all applications (referred to as a "one to many" search). Rather, the policy engine 506 reduces the search space significantly by knowing what particular stored information relating to the expected behavior of the application should be analyzed to determine if the tagged packets are behaving normally, or if the tagged packets could possibly be malware (and thus, should either be analyzed further by deep packet inspection or terminated).

In an alternate embodiment of the second embodiment, the associated information 512 would include an identifier noting that the application includes JAVA. In this embodiment, the hash of the JAVA application along with the associated information 512 would be sent to the policy engine 506. Thus, the firewall 504 would have knowledge of the specific JAVA application that is associated with the packets, and therefore, could utilize that information in the application identifier determination process 514.

Figure 6:
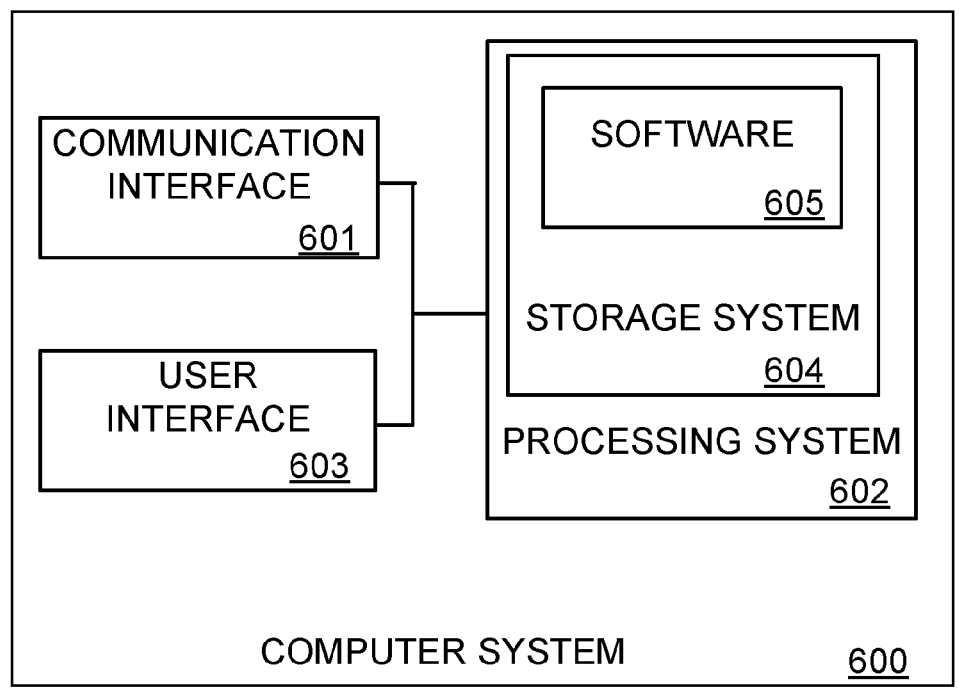
FIG. 6 is a block diagram illustrating a network device in accordance with the various embodiments of the invention.

FIG. 6 is a block diagram illustrating a network device configured to operate as described herein for managing application streams. This network device 800 may include, without limitation, an end user device such as 128-130, 142-144 or 146 in FIG. 1. Network device 600 includes communication interface 601, processing system 602, and user interface 603. Processing system 602 includes storage system 604. Storage system 604 stores software 605, which may include without limitation, software configured to perform the methods described herein. Processing system 602 is linked to communication interface 601 and user interface 603, and may be configured to execute any of the methods described herein. In addition to an end user device, network device 600 could include a programmed general-purpose computer, although those skilled in the art will appreciate that programmable or special purpose circuitry and equipment may be used. Network device 600 may be distributed among multiple devices that together make up elements 601-605.

Communication interface 601 could include a network interface, modem, port, transceiver, or some other communication device. Communication interface 601 may be distributed among multiple communication devices. Processing system 602 could include a computer microprocessor, logic circuit, or some other processing device. Processing system 602 may be distributed among multiple processing devices. User interface 603 could include a keyboard, mouse, voice recognition interface, microphone and speakers, graphical display, touch screen, or some other type of user device. User interface 603 may be distributed among multiple user devices. Storage system 604 could include a disk, tape, integrated circuit, server, or some other memory device. Storage system 604 may be distributed among multiple memory devices.

Processing system 602 retrieves and executes software 605 from storage system 604. Software 605 may include an operating system, utilities, drivers, networking software, and other software typically loaded onto a computer system. Software 605 could include an application program, firmware, or some other form of machine-readable processing instructions. When executed by processing system 602, software 605 directs processing system 602 to operate as described herein to manage application streams in a network.

The various embodiments of the invention offer many advantages over the prior art. If networking devices can identify the specific application that originated an individual packet or flow, then the networking devices will be able to make more intelligent routing decisions. Policy decisions in these networks will become more tailored to specific needs, and the network will have increased visibility into endpoint behavior. With this authoritative knowledge that accompanies the linking of individual flows or packets to specific applications, the network including an embodiment of the present invention will become Layer 7 aware.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Particular implementations of the subject matter described in this specification have been described. Other implementations are within the scope of the following claims. For example, the actions recited in the claims may be performed in a different order and still achieve desirable results. As one example, the processes depicted in the accompanying figures do not necessarily require the particular order shown, or sequential order, to achieve desirable results. In certain implementations, multitasking and parallel processing may be advantageous. Further, any methods described in this application may be implemented as computer software on a computer readable medium.

What is claimed is:

1. A method of providing authoritative application-based routing, the method comprising the steps of:
   generating, by a computing device configured with a network interface, a hash of one or more associated application information associated with an identity of an application executing on the computing device, wherein the application is configured to generate one or more packets, and wherein the one or more associated application information is selected from the group consisting of an application name, an application size, a file path associated with the application, an application run time information, one or more code sections associated with the application, an application source address and/or application destination IP address, one or more ports associated with the application, one or more protocols associated with the application, and a hash generated from an executable associated with the application;
   transmitting, by the computing device, over the network interface, the hash of the one or more associated application information to a network-based policy engine, wherein the transmitted hash of the one or more associated application information is logged by the network-based policy engine into an application information log and is used to determine an application identifier;
   receiving, by the computing device, over the network interface, the application identifier, wherein the application identifier has been verified by the network-based policy engine;
   tagging, by the computing device, or a firewall device associated with the computing device, the application identifier, or an application policy value derived from the application identifier, onto all packets, or a substantial portion thereof, generated from the application prior to transmission to a network; and,
   pushing the tagged packets to other devices in the network, wherein the application identifier of a given tagged packet of the tagged packet is used by the other devices to enforce one or more routing-based policies for the application.

2. The method of claim 1, wherein the one or more routing-based policies include granting a given packet tagged with the application identifier or the application policy value access to a network trusted zone.

3. The method of claim 1, wherein the one or more routing-based policies include restricting routing of a given packet tagged with the application identifier or the application policy value access to only Internet addresses.

4. The method of claim 1, wherein the one or more routing-based policies include dropping a given packet tagged with the application identifier or the application policy value.

5. The method of claim 1, wherein the one or more routing-based policies include routing a given packet tagged with the application identifier or the application policy value to a network device configured to perform deep packet inspection of the given packet.

6. The method of claim 1, wherein the one or more routing-based policies include routing a given packet tagged with the application identifier or the application policy value to an inspection engine.

7. The method of claim 1, wherein the application policy value comprises a QoS metric value.

8. The method of claim 1, wherein one or more network devices in the network is configured to place a given packet tagged with a pre-defined application identifier or the application policy value in a different priority routing queue maintained by the one or more network devices.

9. The method of claim 1, the application identifier is used in dynamic routing decision operations performed by a software-defined network.

10. The method of claim 1, wherein the tagged packet comprises an ACK packet or SYN packet.

11. The method of claim 1, wherein the application identifier or the application policy value is inserted in a http header portion of the tagged packet.

12. The method of claim 1, wherein the application identifier or the application policy value is included at a position in the tagged packet associated with a MAC layer tag or an L2 security group tag.

13. The method of claim 1, wherein the computing device comprises a virtual machine hypervisor, and wherein the associated application information is/are generated by the virtual machine hypervisor.

14. The method of claim 1, wherein the application is a JAVA application.

15. The method of claim 1, wherein the network-based policy engine is implemented in a cloud-based service.

16. The method of claim 1, wherein the network-based policy engine is located in the firewall device associated with the computing device.

17. A system comprising:
   a network interface;
   one or more processors; and
   a memory having instructions stored thereon, wherein execution of the instructions by the one or more processors cause the one or more processors to:
   generate a hash of one or more associated application information associated with an identity of an application executing on the system, wherein the application is configured to generate one or more packets, and wherein the one or more associated application information is selected from the group consisting of an application name, an application size, a file path associated with the application, an application run time information, one or more code sections associated with the application, an application source address and/or application destination IP address, one or more ports associated with the application, and one or more protocols associated with the application;

transmit, over the network interface, the hash of the one or more associated application information to a network-based policy engine, wherein the transmitted hash of the one or more associated application information is logged by the network-based policy engine into an application information log and is used to determine an application identifier;

receive, over the network interface, the application identifier, wherein the application identifier has been verified by the network-based policy engine;

tag the application identifier, or an application policy value derived from the application identifier, onto all packets, or a substantial portion thereof, generated from the application prior to transmission to a network; and push the tagged packets to other devices in the network, wherein the application identifier of a given tagged packet of the tagged packet is used by the other devices to enforce one or more routing-based policies for the application.

18. The system of claim 17, wherein the instructions are executed by a virtual machine hypervisor operating on the system, and wherein the associated application information is generated by the virtual machine hypervisor.

19. A non-transitory computer readable medium having instructions stored thereon, wherein execution of the instructions by one or more processors of a computing device cause the one or more processors to:

generate a hash of one or more associated application information associated with an identity of an application executing on the computing device, wherein the application is used to generate one or more packets, and wherein the one or more associated application information is selected from the group consisting of an application name, an application size, a file path associated with the application, an application run time information, one or more code sections associated with the application, an application source address and/or application destination IP address, one or more ports associated with the application, and one or more protocols associated with the application;

transmit, over a network interface of the computing device, the hash of the one or more associated application information to a network-based policy engine, wherein the transmitted hash of the one or more associated application information is logged by the network-based policy engine into an application information log and is used to determine an application identifier;

receive, over the network interface, the application identifier, wherein the application identifier has been verified by the network-based policy engine;

tag the application identifier, or an application policy value derived from the application identifier, onto all packets, or a substantial portion thereof, generated from the application prior to transmission to a network, wherein the packets are transmitted with the application identifier for use in routing or prioritization of the tagged packet by network devices in the network; and, push the tagged packets to other devices in the network, wherein the application identifier of a given tagged packet of the tagged packet is used by the other devices to enforce one or more routing-based policies for the application.

20. The computer-readable medium of claim 19, wherein the instructions are executed by a virtual machine hypervisor operating on the computing device, and wherein the associated application information is generated by the virtual machine hypervisor.

* * * * *